US008581517B2

(12) United States Patent
Kuo et al.

(10) Patent No.: US 8,581,517 B2
(45) Date of Patent: Nov. 12, 2013

(54) SYSTEMS AND METHODS FOR DRIVING A LIGHT SOURCE

(75) Inventors: Ching-Chuan Kuo, Taipei (TW); Yung Lin Lin, Palo Alto, CA (US)

(73) Assignee: O2 Micro, Inc, Santa Clara, CA (US)

( * ) Notice: Subject to any disclaimer, the term of this patent is extended or adjusted under 35 U.S.C. 154(b) by 588 days.

(21) Appl. No.: 12/561,888

(22) Filed: Sep. 17, 2009

(65) Prior Publication Data
US 2011/0062882 A1 Mar. 17, 2011

(51) Int. Cl.
*G05F 1/00* (2006.01)
(52) U.S. Cl.
USPC .......... 315/307; 315/209 R; 315/224
(58) Field of Classification Search
USPC .......... 315/185 R, 224, 225, 244, 245, 287, 315/291, 307, 312, 314
See application file for complete search history.

(56) References Cited

U.S. PATENT DOCUMENTS

| 6,577,072 | B2 | 6/2003 | Saito et al. | |
|---|---|---|---|---|
| 7,245,088 | B2 * | 7/2007 | Huang et al. | 315/291 |
| 7,285,919 | B2 * | 10/2007 | Newman et al. | 315/224 |
| 7,804,256 | B2 * | 9/2010 | Melanson | 315/291 |
| 7,888,881 | B2 * | 2/2011 | Shteynberg et al. | 315/291 |
| 7,906,917 | B2 * | 3/2011 | Tripathi et al. | 315/291 |
| 2005/0012467 | A1 * | 1/2005 | Nemirow et al. | 315/247 |
| 2007/0024213 | A1 * | 2/2007 | Shteynberg et al. | 315/291 |
| 2007/0170873 | A1 * | 7/2007 | Mishima | 315/291 |
| 2008/0278086 | A1 * | 11/2008 | Chitta et al. | 315/224 |
| 2010/0148691 | A1 * | 6/2010 | Kuo et al. | 315/291 |

FOREIGN PATENT DOCUMENTS

| JP | 2006040669 A | 2/2006 |
|---|---|---|
| JP | 2006202855 A | 8/2006 |
| JP | 3152260 U | 7/2009 |
| WO | 0145470 A1 | 6/2001 |

OTHER PUBLICATIONS

English translation for abstract of JP2006040669A.
English translation for abstract of JP2006202855A.
English translation for abstract of JP3152260U.
English translation for Office Action of JP2010144772 (counterpart Japanese Patent Application for U.S. Appl. No. 12/561,888) dated Jun. 26, 2012 (2 pages).

* cited by examiner

*Primary Examiner* — Shawki S Ismail
*Assistant Examiner* — Christopher Lo

(57) ABSTRACT

A circuit for driving a light source includes a voltage converter, a switch and a controller. The voltage converter converts an AC input voltage signal to a first rectified AC voltage signal. The voltage converter further generates an average signal proportional to an average voltage level of the first rectified AC voltage signal. The switch is coupled to the light source in series. The controller coupled to the voltage converter and the switch compares the first rectified AC voltage signal with the average signal to generate a pulse signal. The controller further generates a dimming control signal based on the pulse signal to control the switch thereby controlling dimming of the light source.

20 Claims, 6 Drawing Sheets

SYSTEMS AND METHODS FOR DRIVING A LIGHT SOURCE

BACKGROUND

Furthermore, as shown in FIG. 5, a duty cycle D of the LPWM signal is given by:

$$D = 1 - \frac{2 \times T1}{T} = 1 - \frac{2 \times T1}{\left(\frac{1}{2 \times f1}\right)} = 1 - 4 \times f1 \times T1, \quad (5)$$

where T is a period of the LPWM signal. Since the product of f1 and T1 is a constant value, the duty cycle D of the LPWM signal is also substantially constant regardless of the amplitude and/or frequency variations in the AC input voltage VIN. In one embodiment, the duty cycle of the LPMW signal from the LPWM generator 430 is determined by the resistors 311, 313, 315 and 317. By changing the resistance of these resistors, the duty cycle of the LPWM signal can be adjusted to adapt to various applications, in one embodiment.

The waveform 509 in FIG. 5 represents an example of an LPWM signal generated by the LPWM generator 430. The waveform 510 in FIG. 5 represents an example of a dimming control signal DIM output from the AND gate 409. When the signal $V_{SIN}$ is less than the signal $V_{DC}$, the LPWM signal is logic low (OFF period). During an OFF period, the dimming control signal DIM output is logic low such that the control switch 411 is switched off. There is no current flowing through the LED string 340 during the OFF period. When the signal $V_{SIN}$ is greater than the signal $V_{DC}$, the LPWM signal is logic high (ON period). During an ON period, a feedback signal FB indicative of a current through the LED string 340 is compared to the predetermined reference signal $V_{REF}$. The dimming control signal DIM is determined by a pulse signal generated by the frequency generator 440 and a comparison result of the feedback signal FB and the predetermined reference signal $V_{REF}$. By way of example, the pulse signal from the frequency generator 440 can have a frequency between approximately 300 KHz and 2.5 MHz. Controlled by the dimming control signal DIM, the control switch 411 can be switched on and off alternately to regulate the LED current flowing through the LED string 340.

However, in the circuit 100 as shown in FIG. 1, only when the AC input voltage $V_{IN}$ is higher than the voltage across the electrolytic capacitor 105, the input current $I_{IN}$ conducts through the rectifier 103. Consequently, the input current $I_{IN}$ represents a pulsating current waveform, which results in a poor power factor, e.g., 0.6. Additionally, the life time or mean time between failures (MTBF) of the electrolytic capacitor 105 is much shorter than other elements of LED driving systems. As such, the electrolytic capacitor 105 dominates the life time of such LED driving systems and therefore impairs the advantage of long operating life of LED light sources.

SUMMARY

In one embodiment, a circuit for driving a light source includes a voltage converter (without an electrolytic capacitor), a switch and a controller. The voltage converter converts an AC input voltage signal to a first rectified AC voltage signal. The voltage converter further generates an average signal proportional to an average voltage level of the first rectified AC voltage signal. The switch is coupled to the light source in series. The controller coupled to the voltage converter and the switch compares the first rectified AC voltage signal with the average signal to generate a pulse signal. The controller further generates a dimming control signal based on the pulse signal to control the switch thereby controlling dimming of the light source.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
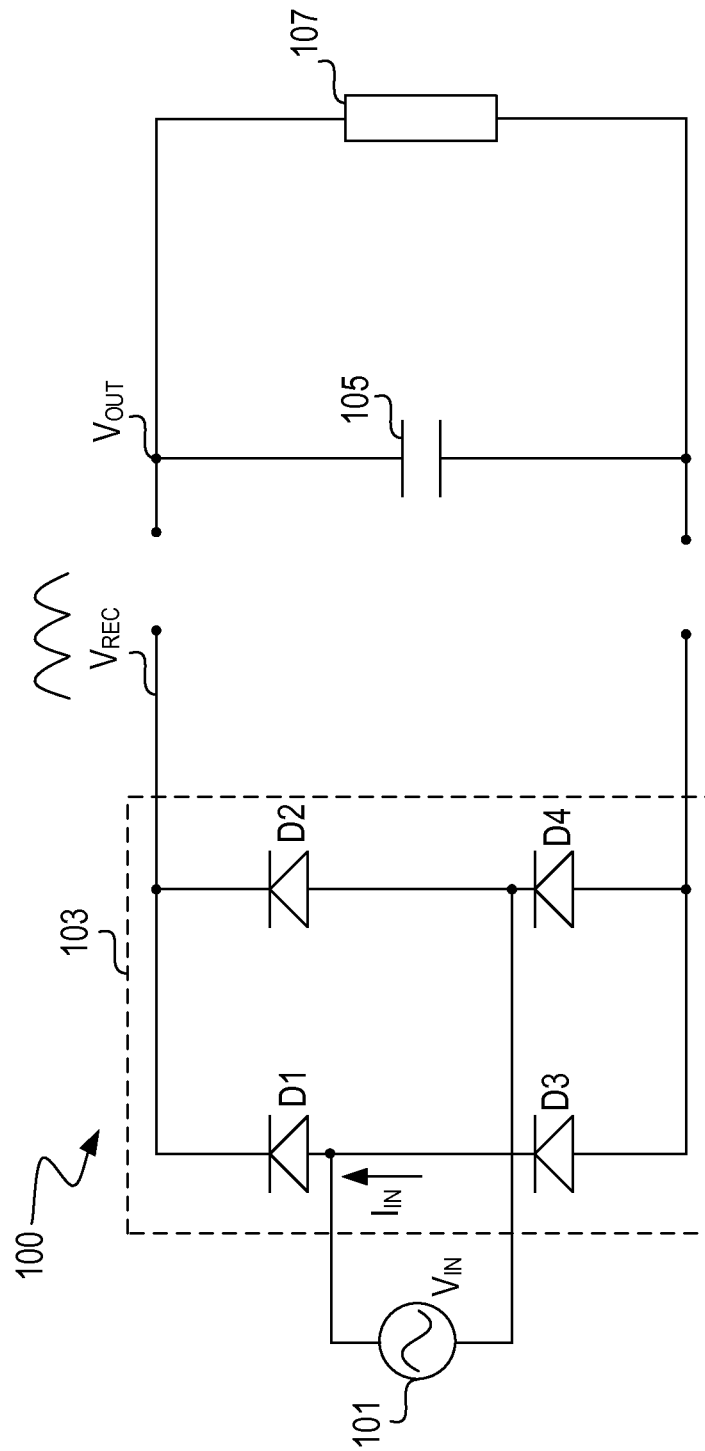
FIG. 1 is a block diagram of a conventional circuit for driving a load.
Figure 2:
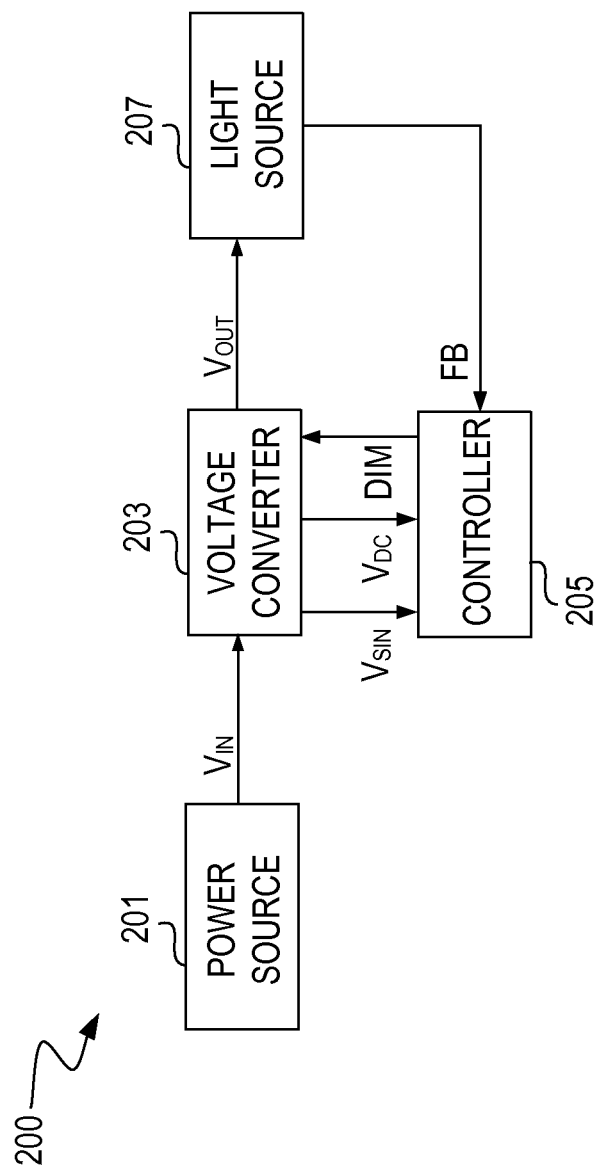
FIG. 2 is a block diagram of a driving circuit according to one embodiment of the present invention.

FIG. 2 illustrates a block diagram of a driving circuit 200 according to one embodiment of the invention. The driving circuit 200 provides a regulated DC output voltage $V_{OUT}$ to a load, e.g., a light source 207. In one embodiment, the driving circuit 200 includes a power source 201, a voltage converter 203, and a controller 205. In one embodiment, the power source 201 generates an AC input voltage $V_{IN}$ signal having a sinusoidal waveform. The voltage converter 203 converts an AC input voltage signal $V_{IN}$ from the power source 201 to a regulated DC output voltage $V_{OUT}$ to drive the light source 207. Furthermore, the voltage converter 203 converts the AC input voltage signal $V_{IN}$ to a first voltage signal $V_{SIN}$ and a second voltage signal (average voltage signal) $V_{DC}$. More specifically, the voltage converter 203 can rectify an AC input voltage signal $V_{IN}$ to provide a rectified AC voltage signal $V_{REC}$. In one embodiment, the voltage converter 203 can generate a voltage signal $V_{SIN}$ that is proportional to the $V_{REC}$. The voltage converter 203 can also provide a DC voltage signal $V_{DC}$ proportional to an average voltage level of the rectified AC voltage signal $V_{REC}$. Therefore, both $V_{DC}$ and $V_{SIN}$ can vary in accordance with the AC voltage signal $V_{IN}$.

The controller 205 receives the signals $V_{SIN}$ and $V_{DC}$ from the voltage converter 203, and further receives a feedback signal FB from the light source 207 to generate a dimming control signal DIM. More specifically, the controller 205 can compare the signal $V_{SIN}$ with the signal $V_{DC}$ to generate a pulse signal having a duty cycle. The controller 205 can further provide a dimming control signal DIM according to the pulse signal and a feedback signal indicating a current through the light source. The dimming control signal DIM is sent to the voltage converter 203. Thus, the voltage converter 203 regulates power delivered to the light source 207 according to the dimming control signal DIM. In other words, the driving circuit 200 provides a dimming control function to adjust the light intensity of the light source 207.

Advantageously, since the signals $V_{DC}$ and $V_{SIN}$ are derived from the rectified AC voltage signal $V_{REC}$, an electrolytic capacitor is removed. By removing the electrolytic capacitor, the driving circuit 200 offers a better power factor and a longer life time compared to the conventional driving circuit 100. Optionally, a ceramic capacitor can be coupled in parallel with the light source 207 to further reduce the noise/ripple of the current through the light source 207.

Furthermore, since both $V_{DC}$ and $V_{SIN}$ vary in accordance with the AC input voltage signal $V_{IN}$, a duty cycle of the pulse signal can be maintained substantially constant even if the AC input voltage signal $V_{IN}$ varies (such as amplitude or frequency variations). For example, if an amplitude of the AC input voltage signal $V_{IN}$ varies from 85 Vrms to 265 Vrms, the duty cycle of the pulse signal can still be maintained substantially constant. Thus, the dimming control signal DIM is not affected by such variation and therefore a relatively constant illumination of the light source 207 can be achieved, which is described in detail in relation to FIG. 3-FIG. 5.

Figure 3:
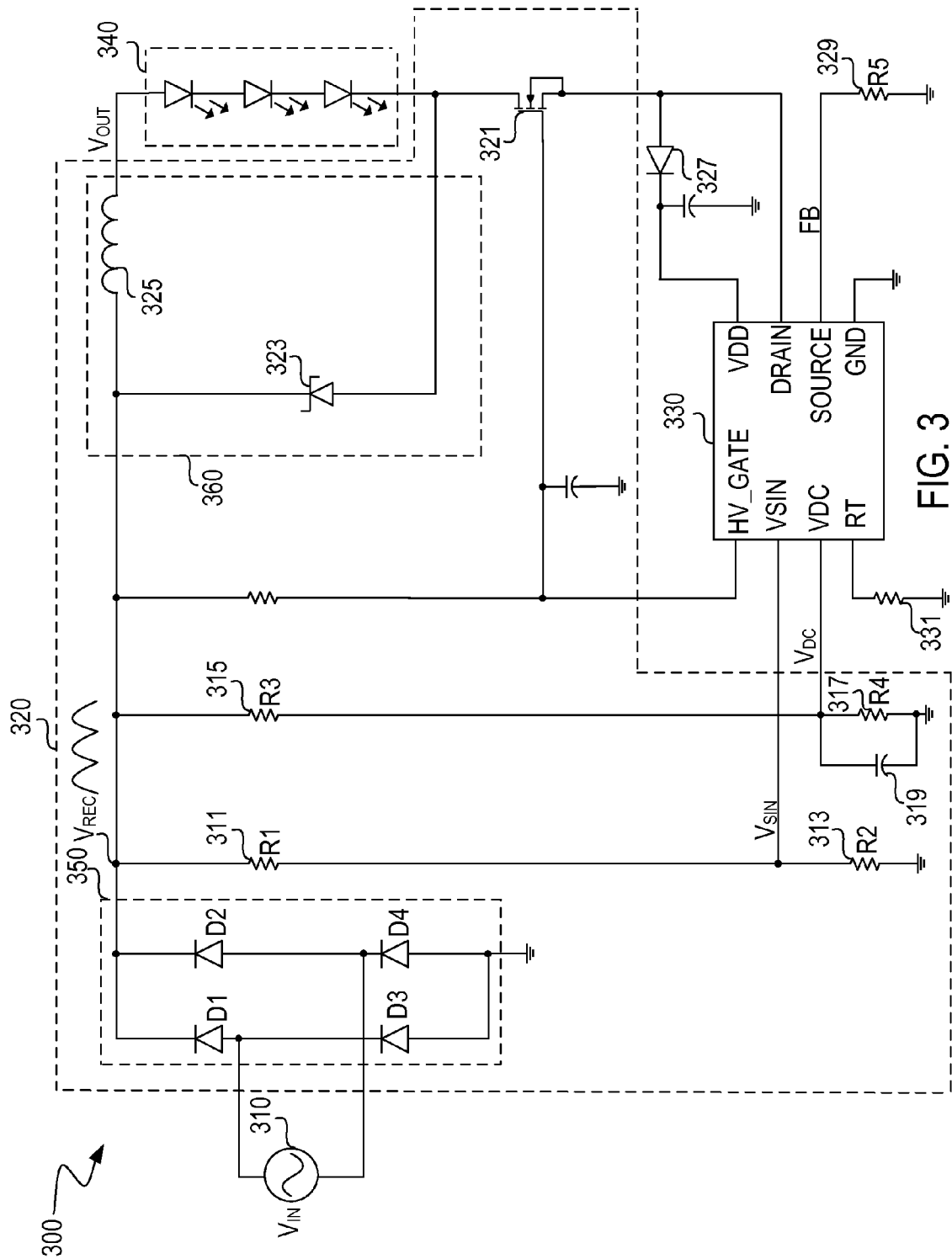
FIG. 3 is an example of a schematic diagram of a driving circuit according to one embodiment of the present invention.

FIG. 3 illustrates an example of a schematic diagram of a driving circuit 300 according to one embodiment of the present invention. The driving circuit 300 provides a regulated DC output voltage $V_{OUT}$ to a load 340. For illustrative purposes, the load 340 includes three LEDs coupled in series. However, the invention is not so limited. The load 340 may include other numbers of light sources and various types of light sources. The driving circuit 300 includes a power source 310, a voltage converter 320, a controller 330, and a switch 321. The voltage converter 320 further includes a voltage rectifier 350, a buck converter 360, a capacitor 319, a first voltage divider including resistors 311 and 313, and a second voltage divider including resistors 315 and 317.

In one embodiment, the power source 310 generates an AC input voltage signal $V_{IN}$ having a sinusoidal waveform. The voltage converter 320 converts the AC input voltage signal $V_{IN}$ to a regulated DC output voltage $V_{OUT}$. More specifically, the voltage rectifier 350 including diodes D1 through D4 rectifies the AC input voltage $V_{IN}$ signal to provide a rectified AC voltage signal $V_{REC}$. The voltage rectifier 350 shown in FIG. 3 is a full-wave rectifier which outputs two peaks per cycle of the AC input voltage signal $V_{IN}$. As such, the repetition rate of the rectified AC voltage signal $V_{REC}$ is twice of the AC input voltage signal $V_{IN}$. The buck converter 360 including a diode 323 and an inductor 325 further converts the rectified AC voltage signal $V_{REC}$ into a regulated DC output voltage $V_{OUT}$ suitable for driving the LED string 340.

Furthermore, a first voltage divider including the resistors 311 and 313 further divides the rectified AC voltage signal $V_{REC}$ to a divided voltage signal $V_{SIN}$. The signal $V_{SIN}$ is proportional to the signal $V_{REC}$ and follows the waveform of the signal $V_{REC}$. A second voltage divider including the resistors 315 and 317 can cooperate with the capacitor 319 to provide a voltage signal $V_{DC}$ proportional to an average voltage level of the signal $V_{REC}$. Thus, it can be inferred that the signal $V_{DC}$ is also proportional to an average voltage level of the signal $V_{SIN}$.

The signals $V_{SIN}$ and $V_{DC}$ are provided to the controller 330 via a VSIN pin and a VDC pin respectively. An HV_GATE pin of the controller 330 is coupled to the gate of the switch 321, e.g., constructed of an N type metal-oxide-semiconductor field effect transistor (MOSFET), for providing a constant DC voltage. In one embodiment, the constant DC voltage is 15V. The drain of the switch 321 is coupled to the LED string 340. The source of the switch 321 is coupled to a DRAIN pin of the controller 330 and to a VDD pin of the controller 330 through a diode 327. Driven by the constant DC voltage from the HV_GATE pin, the switch 321 is switched on. The VDD pin obtains a startup voltage derived from a source voltage at the source of the switch 321. The startup voltage enables the operation of the controller 330.

In one embodiment, the controller 330 compares the signals $V_{SIN}$ and $V_{DC}$ to control a conduction state of a switch (shown as switch 411 in FIG. 4) in the controller 330, whose drain and source are coupled to the DRAIN pin and the SOURCE pin respectively. In another embodiment, the switch can also be located outside the controller 330. In both circumstances, the switch controls power delivered from the voltage converter 320 to the LED string 340, thereby controlling the dimming of the LED string 340. Furthermore, a duty cycle representing a ratio of the ON time duration of the switch to a total ON and OFF time duration of the switch in a cycle is not affected by the amplitude and/or frequency variations in the AC input voltage $V_{IN}$, in one embodiment. Thus, the LED string 340 can provide a relatively constant illumination even if the AC input voltage $V_{IN}$ varies.

In one embodiment, the resistor 329 senses an LED current flowing through the LED string 340 to generate a feedback signal FB. The SOURCE pin of the controller 330 receives the feedback signal FB indicative of the LED current. The controller 330 controls the conduction state of the switch (shown as switch 411 in FIG. 4) based on the feedback signal FB to regulate the LED current. Accordingly, the light intensity of the LED string 340 is adjusted based on the feedback signal FB. The RT pin of the controller 330 is coupled to a resistor 331 to determine an operating frequency of the controller 330. The GND pin of the controller 330 is coupled to ground.

As presented above, the driving circuit 300 is not equipped with an electrolytic capacitor and therefore offers a better power factor and a longer life time. Furthermore, even if the AC input voltage $V_{IN}$ varies its amplitude and/or its frequency, a relatively constant illumination of the LED string 340 can still be achieved.

Figure 4:
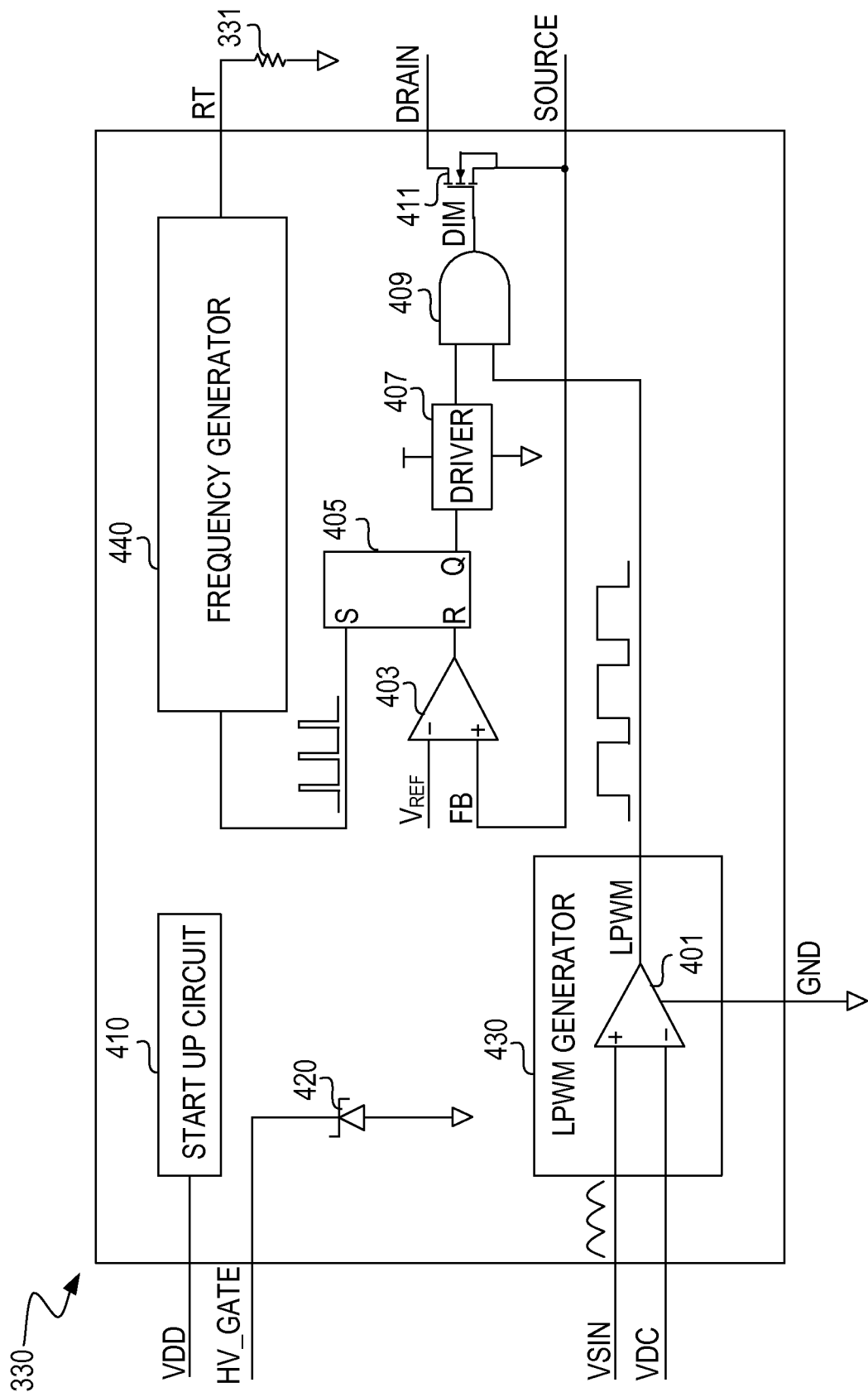
FIG. 4 is an example of a schematic diagram of a controller in FIG. 3 according to one embodiment of the present invention.

FIG. 4 illustrates an example of a circuit diagram of the controller 330 according to one embodiment of present invention. Elements labeled the same in FIG. 3 have similar functions. FIG. 4 is described in combination with FIG. 3. The controller 330 includes a startup circuit 410, a Zener diode 420, a pulse width modulation generator such as a lateral pulse width modulation (LPWM) generator 430, a frequency generator 440, a comparator 403, a flip-flop 405 (e.g., a set-reset flip-flop), a driver 407, an AND gate 409, and a switch 411.

The Zener diode 420 generates a constant DC voltage at the HV_GATE pin. Driven by a constant DC voltage, the switch 321 is conducted and allows a startup voltage to be generated at the VDD pin. The startup circuit 410 receives the startup voltage and provides power to other electric elements to enable operation of the controller 330 if the startup voltage at the VDD pin reaches a predetermined startup voltage level of the controller 330. The LPWM generator 430, including a comparator 401, compares the signal $V_{SIN}$ at the VSIN pin with the signal $V_{DC}$ at the VDC pin. The LPWM generator 430 outputs a lateral pulse width modulation (LPWM) signal based on a comparison result of the signals $V_{SIN}$ and $V_{DC}$. Since the signal $V_{DC}$ is proportional to an average voltage level of the rectified AC voltage signal $V_{REC}$, and the signal $V_{SIN}$ is proportional to the rectified AC voltage signal $V_{REC}$, both signals $V_{DC}$ and $V_{SIN}$ vary in accordance with the signal $V_{REC}$. In other words, both signals $V_{DC}$ and $V_{SIN}$ vary in accordance with the AC input voltage signal $V_{IN}$. As a result, the LPWM signal can have a substantially constant duty cycle even if an amplitude and/or a frequency of the AC input voltage signal $V_{IN}$ varies. As used herein, "substantially constant" means that the duty cycle of the LPWM signal may vary slightly due to a waveform distortion of the AC input voltage signal $V_{IN}$ (e.g., caused by a utility company) or due to non-ideality of the circuit components, but within a range such that the LED string 340 produces a relatively constant brightness.

Furthermore, in the example of FIG. 4, the frequency generator 440 generates a pulse signal which has a frequency determined by the resistor 331. Of course, the frequency generator 440 can be modified such that it generates a pulse signal which has a frequency determined by a capacitor. Thus, in one embodiment, the pulse signal from the frequency generator 440 can have a fixed frequency. An S-R flip-flop 405 receives the pulse signal via an S pin. An R pin of the S-R flip-flop 405 is coupled to an output of the comparator 403 which compares the feedback signal FB at the SOURCE pin of the controller 330 with a predetermined reference signal $V_{RFE}$, e.g., 0.25V. In one embodiment, the predetermined reference signal $V_{RFE}$ indicates a peak current flowing through the LED string 340. Therefore, in one embodiment, if the feedback signal FB is greater than the predetermined reference signal $V_{RFE}$, the S-R flip-flop is reset. A Q pin S-R flip-flop 405 is coupled to an AND gate 409 through a driver 407 to provide a pulse signal controlled by the output of the comparator 403. The AND gate 409 also receives the LPWM signal from the LPWM generator 430.

A dimming control signal DIM output from the AND gate 409 controls the conduction state of the control switch 411. Referring to FIG. 3 and FIG. 4, the control switch 411 is coupled in series with the LED string 340 when the switch 411 is switched on. As such, the dimming control signal DIM controls the power delivered from the voltage converter 320 to the LED string 340 by turning the control switch 411 on and off alternately. Furthermore, the dimming control signal DIM is determined by both of the comparison between the signals $V_{SIN}$ and $V_{DC}$ and the comparison between the feedback signal FB and the predetermined reference signal $V_{REF}$.

Figure 5:
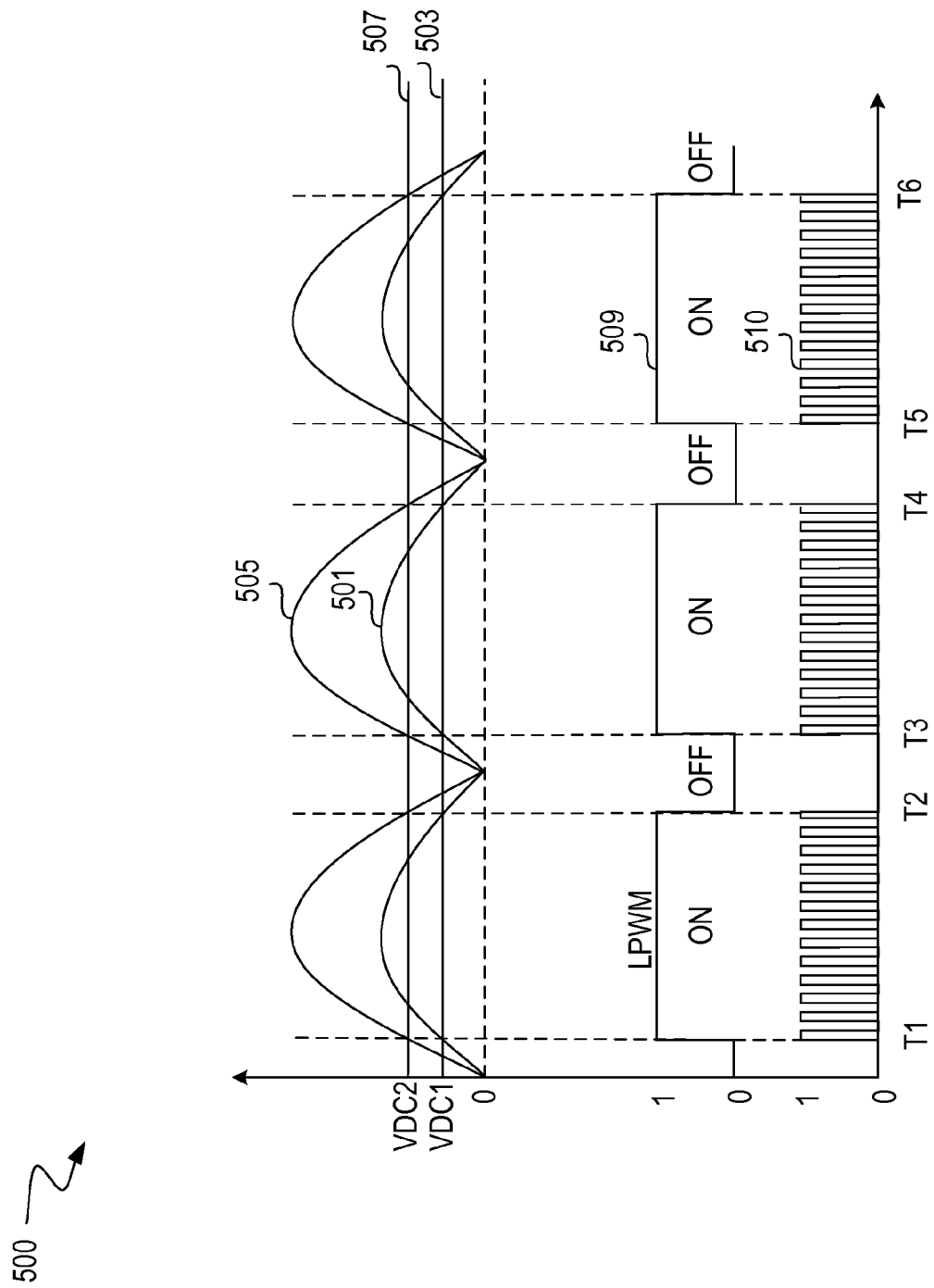
FIG. 5 is an example of a timing diagram of signals generated by a driving circuit according to one embodiment of the present invention.

FIG. 5 illustrates an example of a timing diagram 500 of signals generated by a driving circuit according to one embodiment of the present invention. FIG. 5 is described in combination with FIG. 4. For illustrative purposes, the AC input voltage $V_{IN}$ is a sinusoidal waveform signal having a frequency of $f_1$ Hz (e.g., 60 Hz) and has a range from 85 Vrms to 265 Vrms. The waveform 501 represents the signal $V_{SIN}$ derived from the 85 Vrms AC input voltage $V_{IN}$ and the waveform 505 represents the signal $V_{SIN}$ derived from the 265 Vrms AC input voltage $V_{IN}$. The line 503 represents the signal $V_{DC}$ derived from the 85 Vrms AC input voltage $V_{IN}$ and the line 507 represents the signal $V_{DC}$ derived from 265 Vrms AC input voltage $V_{IN}$.

Assuming that the signal $V_{SIN}$ reaches the signal $V_{DC}$ at time T1, the time T1 can be given by:

$$\mathrm{Sin}(2\pi f_1 T1) = V_{DC}/V_{SIN\text{-}PK}, \quad (1)$$

where $V_{SIN\text{-}PK}$ represents the peak voltage of the signal $V_{SIN}$. Referring back to FIG. 3, since the signal $V_{SIN}$ is obtained by dividing the signal $V_{REC}$ by the resistors 311 and 313, the peak voltage $V_{SIN\text{-}PK}$ of the signal $V_{SIN}$ can be given by:

$$V_{SIN-PK} = \left(\frac{R2}{R1+R2}\right) \times V_{REC-PK}, \quad (2)$$

where R1 is the resistance of the resistor 311, R2 is the resistance of the resistor 313, and $V_{REC\text{-}PK}$ is the peak voltage of the signal $V_{REC}$. In the example of FIG. 3, the signal $V_{DC}$ represents an average voltage level of a signal that is divided from the signal $V_{REC}$ by the resistors 315 and 317. Thus, the signal $V_{DC}$ can be given by:

$$V_{DC} = \frac{2}{\pi} \times \left(\frac{R4}{R3+R4}\right) \times V_{REC-PK}, \quad (3)$$

where R3 is the resistance of the resistor 315 and R4 is the resistance of the resistor 317. Therefore, combining equations (1), (2) and (3), the time T1 can be given by:

$$\mathrm{Sin}(2\pi f_1 T1) = \frac{2}{\pi} \times \frac{\left(\frac{R4}{R3+R4}\right)}{\left(\frac{R2}{R1+R2}\right)}. \quad (4)$$

According to equation (4), a product of f1 and T1 maintains substantially constant regardless of the amplitude and/or frequency variations in the AC input voltage $V_{IN}$.

Furthermore, as shown in FIG. 5, a duty cycle D of the LPWM signal is given by:

$$D = 1 - \frac{2 \times T1}{T} = 1 - \frac{2 \times T1}{\left(\frac{1}{2 \times f1}\right)} = 1 - 4 \times f1 \times T1, \quad (5)$$

where T is a period of the LPWM signal. Since the product of f1 and T1 in is a constant value, the duty cycle D of the LPWM signal is also substantially constant regardless of the amplitude and/or frequency variations in the AC input voltage $V_{IN}$. In one embodiment, the duty cycle of the LPMW signal from the LPWM generator 430 is determined by the resistors 311, 313, 315 and 317. By changing the resistance of these resistors, the duty cycle of the LPWM signal can be adjusted to adapt to various applications, in one embodiment.

Assuming that the frequency of the AC input voltage $V_{IN}$ is constant, the waveforms in FIG. 5 also illustrate that the duty cycle of the LPWM signal remains constant even if the amplitude of the AC input voltage $V_{IN}$ varies. The line 503 intersects with the waveform 501 at time T1, T2, T3, T4, T5 and T6, and the line 507 intersects with the waveform 505 at the same time T1, T2, T3, T4, T5 and T6. Therefore, the intersections between the signal $V_{DC}$ and the signal $V_{SIN}$ occur at the same time irrespective of the amplitude variation in the AC input voltage $V_{IN}$. As such, by comparing the signal $V_{DC}$ with the signal $V_{SIN}$, the LPWM generator 430 generates an LPWM signal with a substantially constant duty cycle even if the AC input voltage $V_{IN}$ varies.

The waveform 509 in FIG. 5 represents an example of an LPWM signal generated by the LPWM generator 430. The waveform 509 in FIG. 5 represents an example of a dimming control signal DIM output from the AND gate 409. When the signal $V_{SIN}$ is less than the signal $V_{DC}$, the LPWM signal is logic low (OFF period). During an OFF period, the dimming control signal DIM output is logic low such that the control switch 411 is switched off. There is no current flowing through the LED string 340 during the OFF period. When the signal $V_{SIN}$ is greater than the signal $V_{DC}$, the LPWM signal is logic high (ON period). During an ON period, a feedback signal FB indicative of a current through the LED string 340 is compared to the predetermined reference signal $V_{REF}$. The dimming control signal DIM is determined by a pulse signal generated by the frequency generator 440 and a comparison result of the feedback signal FB and the predetermined reference signal $V_{REF}$. By way of example, the pulse signal from the frequency generator 440 can have a frequency between approximately 300 KHz and 2.5 MHz. Controlled by the dimming control signal DIM, the control switch 411 can be switched on and off alternately to regulate the LED current flowing through the LED string 340.

In summary, embodiments in accordance with the present invention utilize a rectified AC signal $V_{REC}$ to generate a signal $V_{SIN}$ (such as the waveform 501 or 505 in FIG. 5) proportional to the signal $V_{REC}$ and a signal $V_{DC}$ (such as the waveform 503 or 507 in FIG. 5) indicating an average voltage level of the signal $V_{REC}$. Thus, an electrolytic capacitor is removed. By removing the electrolytic capacitor, the driving circuit according to embodiments of the present invention offers an enhanced power factor and a longer life time. Furthermore, by comparing the signal $V_{SIN}$ with the signal $V_{DC}$ and comparing the feedback signal FB with the predetermined reference signal $V_{REF}$, a relatively constant illumination of the LED string 340 can be achieved regardless of the amplitude and/or frequency variations in the AC input voltage $V_{IN}$.

Figure 6:
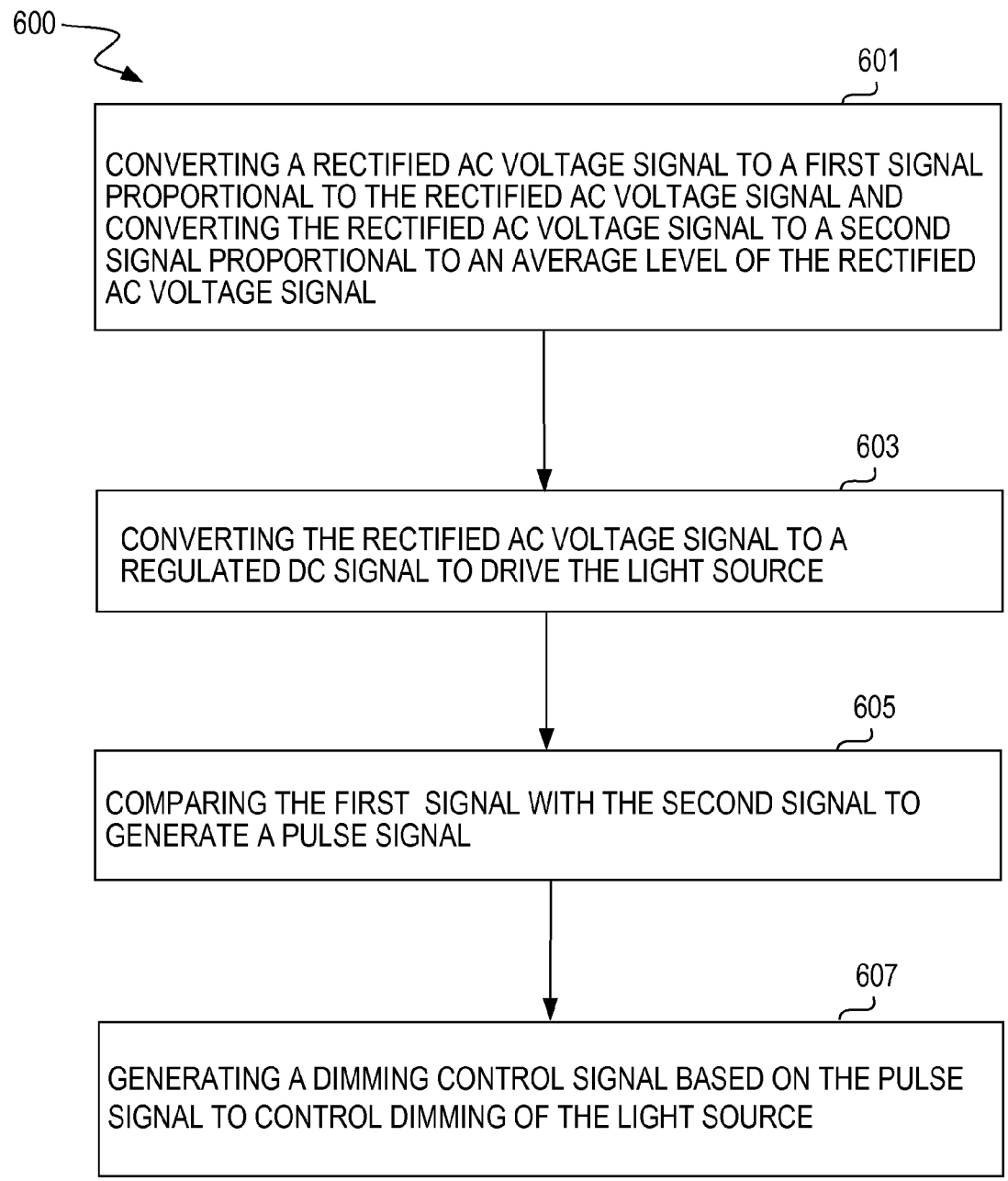
FIG. 6 is a flowchart of a method for driving a light source according to one embodiment of the present invention.

FIG. 6 illustrates a flowchart 600 of a method for driving a light source, e.g., an LED string, according to one embodiment of the present invention. Although specific steps are disclosed in FIG. 6, such steps are exemplary. That is, the present invention is well suited to performing various other steps or variations of the steps recited in FIG. 6. FIG. 6 is described in combination with FIG. 3 and FIG. 4.

In block 601, a rectified AC voltage signal is converted to a first signal proportional to the rectified AC voltage signal. The rectified AC voltage signal is further converted to a second signal proportional to an average voltage level of the rectified AC voltage signal. In one embodiment, the voltage converter 320 first converts an AC input voltage signal $V_{IN}$ to a rectified AC voltage $V_{REC}$. The voltage converter 320 further converts the $V_{REC}$ to a first signal $V_{SIN}$ and a second signal $V_{DC}$. The signal $V_{SIN}$ is proportional to the signal $V_{REC}$ and the signal $V_{DC}$ is proportional to an average voltage level of the signal $V_{REC}$.

In block 603, the rectified AC voltage signal is also converted to a regulated DC voltage signal to drive the light source. In one embodiment, the voltage converter 320 converts the signal $V_{REC}$ to a regulated DC output voltage $V_{OUT}$ to drive the LED string 340.

In block 605, the first signal is compared with the second signal to generate a pulse signal. In one embodiment, the LPWM generator 430 compares the first signal $V_{SIN}$ with the second signal $V_{DC}$ to generate an LPWM signal. In one embodiment, the LPWM signal has a substantially constant duty cycle regardless of the amplitude and/or frequency variations in the AC input voltage $V_{IN}$.

In block 607, a dimming control signal is generated based on the pulse signal to control dimming of the light source. In one embodiment, based on the LPWM signal and a comparison result between a reference signal and a feedback signal indicating a current through the LED 340, the AND gate 409 provides the dimming control signal DIM to the control switch 411 to control the dimming of the LED string 340 accordingly.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for driving a light emitting diode (LED) light source, said circuit comprising:
a voltage converter operable for converting an alternating current (AC) input voltage signal to a first rectified AC voltage signal, and for generating an average signal proportional to an average voltage level of said first rectified AC voltage signal;
a switch coupled to said LED light source in series; and
a controller coupled to said voltage converter and said switch and operable for comparing said first rectified AC voltage signal with said average signal to generate a pulse signal, and for generating a dimming control signal according to said pulse signal to control said switch thereby controlling dimming of said LED light source.

2. The circuit of claim 1, wherein said pulse signal comprises a pulse width modulation signal having a substantially constant duty cycle regardless of an amplitude variation in said AC input voltage signal.

3. The circuit of claim 1, wherein said pulse signal comprises a pulse width modulation signal having a substantially constant duty cycle regardless of a frequency variation in said AC input voltage signal.

4. The circuit of claim 1, wherein said voltage converter comprises:
a rectifier operable for rectifying said AC input voltage signal to a second rectified AC voltage signal;
a first voltage divider coupled to said rectifier and operable for dividing said second rectified AC voltage signal to provide said first rectified AC voltage signal; and
a second voltage divider coupled to said rectifier and operable for dividing said second rectified AC voltage signal to provide said average signal, wherein said average signal is also proportional to an average voltage level of said second rectified AC voltage signal.

5. The circuit of claim 4, wherein said first voltage divider and said second voltage divider comprise a plurality of resistors, and wherein a duty cycle of said pulse signal is determined by resistance of said resistors.

6. The circuit of claim 1, wherein said controller further comprises a comparator operable for receiving a feedback signal indicative of a current flowing through said LED light source and for comparing said feedback signal with a predetermined reference signal.

7. The circuit of claim 6, wherein said predetermined reference signal indicates a peak current flowing through said LED light source.

8. The circuit of claim 6, further comprising:
an AND gate coupled to said comparator and operable for generating said dimming control signal based on said pulse signal and an output of said comparator.

9. The circuit of claim 1, wherein said voltage converter converts said AC input voltage signal to a regulated voltage to drive said LED light source.

10. The circuit of claim 1, wherein said voltage converter does not include an electrolytic capacitor.

11. The circuit of claim 1, wherein said controller further comprises a frequency generator operable for generating a frequency signal, and wherein said dimming control signal is generated based on said frequency signal and said pulse signal.

12. The circuit of claim 11, wherein said switch is switched on and off alternately according to said frequency signal and a feedback signal indicating a current flowing through said LED light source during an on period of said pulse signal, and wherein said switch remains off during an off period of said pulse signal.

13. A system comprising:
a voltage converter coupled to a light emitting diode (LED) light source and operable for converting an AC input voltage signal to a regulated voltage signal to drive said LED light source and for generating a first output voltage signal and a second output voltage signal based on said AC input voltage signal; and
a controller coupled to said voltage converter and operable for comparing said first output voltage signal to said second output voltage signal to generate a pulse signal having a substantially constant duty cycle regardless of a variation in said AC input voltage signal, and for comparing a feedback signal indicative of a light source current with a predetermined reference signal to generate a comparison signal,
wherein said controller is further configured to generate a control signal based on said pulse signal and said comparison signal to regulate power delivered to said LED light source.

14. A controller for regulating the brightness of a light emitting diode (LED) light source, said controller comprising:
a first voltage input pin operable for receiving a first voltage signal proportional to a rectified AC signal of a power supply of said LED light source;
a second voltage input pin operable for receiving a second voltage signal proportional to an average voltage of said rectified AC signal;
a sense pin operable for receiving a feedback signal indicative of a current flowing through said LED light source,
wherein said controller is configured to generate a pulse width modulation (PWM) signal by comparing said first voltage signal with said second voltage signal, and to provide a pulse signal according to a frequency signal and a comparison result of said feedback signal and a reference signal, and to generate a dimming control signal based on said PWM signal and said pulse signal to regulate said brightness.

15. The controller of claim 14, further comprising:
a pin operable for determining a frequency of said frequency signal.

16. The controller of claim 14, further comprising:
a switch coupled to said LED light source in series and operable for receiving said dimming control signal and being switched on and off according to said dimming control signal.

17. The controller of claim 14, further comprising:
a switch coupled to said LED light source in series,
wherein said switch is switched on and off alternately according to said frequency signal and said feedback signal during an ON period of said PWM signal, and wherein said switch is off during an OFF period of said PWM signal.

18. The controller of claim 14, further comprising:
a flip-flop operable for receiving said frequency signal and for receiving said comparison result of said feedback signal and a reference signal, and for providing said pulse signal.

19. The controller of claim 14, further comprising:
an AND gate operable for receiving said PWM signal and said pulse signal, and for providing said dimming control signal.

20. The controller of claim 14, wherein said reference signal indicates a peak current flowing through said LED light source.

* * * * *